June 28, 1932. J. B. D. THOMPSON 1,864,682

ARTICULATED CAR

Filed March 2, 1931

INVENTOR
John B. D. Thompson
BY
ATTORNEY

Patented June 28, 1932

1,864,682

UNITED STATES PATENT OFFICE

JOHN B. D. THOMPSON, OF UNION CITY, NEW JERSEY, ASSIGNOR TO AMERICAN CAR AND FOUNDRY COMPANY, OF NEW YORK, N. Y., A CORPORATION OF NEW JERSEY

ARTICULATED CAR

Application filed March 2, 1931. Serial No. 519,437.

This invention relates to articulated cars in which the adjacent end portions of two car bodies are supported by a single truck, known in the art as a pivot truck and has particular reference to means for effecting articulation of said adjacent end portions.

One object of this invention is the provision of a connection for the adjacent end portions of two bodies of an articulated car which will maintain said end portions in their proper relative positions and at the same time will permit said end portions to swivel freely relative to each other.

Another object of this invention is the provision of a connection for the adjacent end portions of two bodies of an articulated car which includes a buffing element for maintaining the bodies in their proper spaced relation while permitting free relative swiveling thereof, said buffing element defining the center of articulation and being so formed and arranged as to restrain the bodies against relative sidewise and vertical shifting.

Still another object of this invention is the provision of a buffer element arranged between the adjacent end portions of two car bodies and defining the center of rotation thereof, which buffer element comprises a combined spacer for the bodies and a support for the foot plate which extends between the said bodies.

Figure 1:
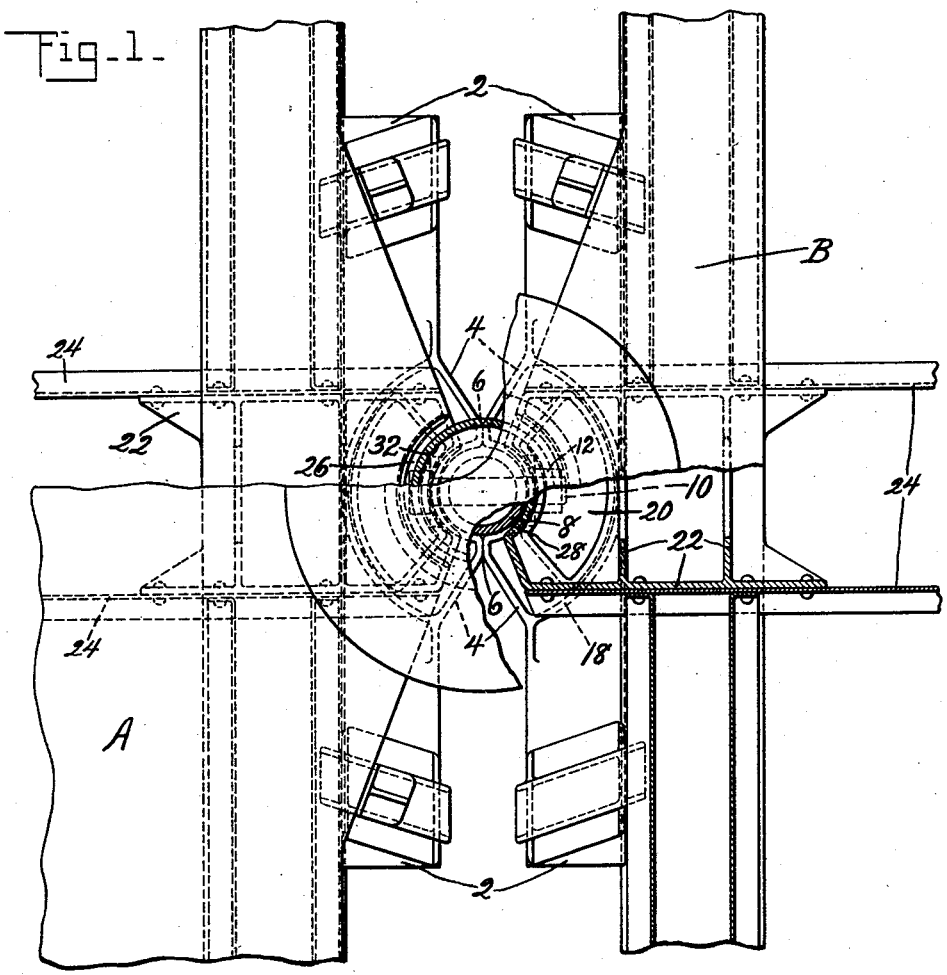
Figure 2:
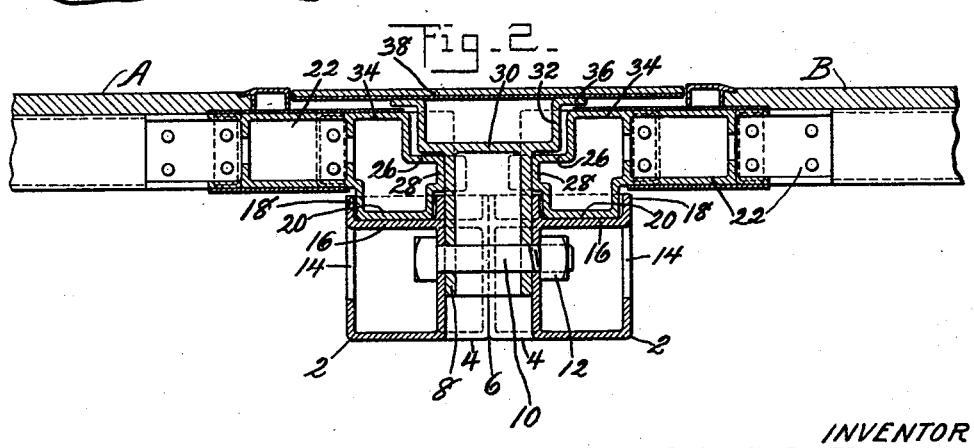

Other objects and advantages of this invention will be apparent from the following description taken in conjunction with the accompanying drawing in which:

Figure 1 is a top plan view showing parts of the adjacent end portions of two bodies of an articulated car, certain parts being shown in section and other parts being broken away, and Fig. 2 is a sectional view through the adjacent end portions of the bodies shown in Figure 1.

Referring now more particularly to the drawing in which similar characters of reference designate similar parts in the several views, Figure 1 shows the adjacent end portions of two bodies indicated generally at A and B. Inasmuch as the specific construction of the bodies above the underframe forms no part of the invention the same is not shown except certain parts which are shown more or less diagrammatically. Only such parts as are necessary for an understanding of the present invention are illustrated. The adjacent end portions of the bodies are supported by a single truck which, in the main, may be of any preferred or desired construction, but which includes a pair of truck bolsters 2 which, in the instance shown, are of box construction. The contiguous walls of the bolsters intermediate their ends are provided with longitudinally recessed projections 4 which projections abut as shown at 6. The longitudinal recesses in the projections 4 define a substantially circular opening for receiving a center pin 8 which forms the center of rotation or swiveling movement of the bodies. This center pin is connected to the bolsters 2 by means of a horizontally arranged pin 10, extending through adjacent side walls of the bolsters at the center of rotation of the bodies, and said pin is retained by a nut 12. Suitable openings 14 are provided in the outer walls of the bolsters to permit insertion and removal of the pin when necessary, and said pin defines a means for permitting relative vertical pivoting of the bolsters on a horizontal axis, as will be apparent.

The upper walls of the bolsters are provided with arcuate-shaped bearing surfaces 16 between the flanges 18 and said bearing surfaces receive the bearings 20 depending from the lower walls of body castings 22 arranged between and connected to center sills 24 of the body underframes and forming parts of said underframes.

The forward ends of the castings 22 are provided with horizontally arranged shoulders 26 while the front walls 28 of the castings are curved to be arranged adjacent the center pin 8 whereby the latter prevents excessive relative sidewise shifting of the adjacent end portions of the bodies.

The center pin 8 defines the center of rotation or swiveling movement of the bodies, but also absorbs shocks and serves to transmit said shocks from one body to the other and from said bodies to the truck, but in addition to these functions, the center pin is provided with a head 30 which overlaps the shoulders 26 as shown in Fig. 2 for the purpose of preventing excessive relative vertical shifting of the bodies.

This invention also contemplates the provision of means for supporting a foot plate which extends between the adjacent end portions of the bodies, and to that end the head 30 is provided with a vertical marginal flange 32 which extends above the top walls 34 of the castings 22 and is outwardly flanged to provide an annular supporting surface 36 for a foot plate 38.

In use, it will be apparent that the bodies A and B may swivel relative to each other in the bearing surfaces 16 and the pivot 10 provides a means for permitting relative shifting of the bolsters 2 to conform to variations in track grades. Because of the partial encircling of the pin 8 by the front walls of the castings, excessive relative sidewise shifting of the bodies is prevented, while excessive relative vertical shifting of the bodies is prevented by the head 30 of the pin 8. Obviously some slight relative sidewise and vertical shifting of the bodies is necessary under service conditions and suitable clearance is provided between parts for this purpose, but it will be obvious that excessive relative vertical and sidewise shifting is prevented by the present construction.

To assemble the car of the present invention the castings 22 are arranged in the bearing surfaces, then the pin 8 is inserted into the position illustrated in Fig. 2 and connected to the bolsters by means of the pivot pin 10. The foot plate 38 may be and preferably is attached to the annular surface 36 prior to the arrangement of the pin 8 between the end portions of the bodies.

The drawing herein illustrates one embodiment of the invention but is for illustrative purposes only and various changes in the form and proportions of the construction shown may be made within the scope of the appended claims without departing from the spirit of the invention.

What is claimed is:

1. In an articulated car comprising a pair of car bodies, a truck arranged beneath the adjacent end portions of said bodies, a pair of truck bolsters for respectively supporting the adjacent end portions, buffing means arranged between the adjacent end portions of said bodies for retaining the said end portions in proper spaced relation and for restraining them against excessive relative vertical and sidewise shifting, and means connecting the bolsters for pivotal movement about a horizontal axis.

2. In an articulated car comprising a pair of car bodies, a truck arranged beneath the adjacent end portions of said bodies and provided with a pair of bolsters, bearing surfaces on the bolsters for respectively supporting the adjacent end portions for relative swiveling movement in a horizontal plane, buffing means interposed between the adjacent end portions of the bodies for retaining them in proper spaced relation and for restraining them against relative sidewise and vertical shifting, said buffing means defining the center of articulation for said bodies, and means securing the buffing means against displacement and connecting the bolsters for relative pivotal movement.

3. In an articulated car comprising a pair of car bodies, a truck arranged beneath the adjacent end portions of said bodies, a pair of truck bolsters for respectively supporting said end portions, said bolsters having projections formed intermediate their ends on the contiguous walls thereof, said projections being longitudinally recessed, bearing surfaces on the bolsters on which the respective end portions are mounted for horizontal swiveling movement, a center pin arranged between the adjacent end portions of the bodies and extended into the bolster recesses for absorbing buffing shocks and for preventing relative sidewise and vertical shifting of the bolsters, said pin defining the center of swiveling movement of the bodies and having a part thereof lapping the adjacent end portions of the bodies for preventing excessive relative shifting of said bodies.

4. In an articulated car comprising a pair of car bodies, a truck arranged beneath the adjacent end portions of said bodies, a pair of truck bolsters for respectively supporting said end portions, said bolsters having projections formed intermediate their ends on the contiguous walls thereof, said projections being longitudinally recessed, bearing surfaces on the bolsters on which the respective end portions are mounted for horizontal swiveling movement, a center pin arranged between the adjacent end portions of the bodies and extended into the bolster recesses for absorbing buffing shocks and for preventing relative sidewise and vertical shifting of the bolsters, said pin defining the center of swiveling movement of the bodies and having a part thereof lapping the adjacent end portions of the bodies for preventing excessive relative shifting of said bodies, and means connecting the bolsters and center pin for restraining the latter against displacement and for permitting relative pivotal movement of said bolsters about a horizontal axis.

5. In an articulated car comprising a pair of car bodies, a truck beneath the adjacent end portions of said bodies, said truck having a pair of bolsters for respectively supporting the said end portions, a foot plate supporting element arranged between the adjacent end portions and the bolsters and defining the axis of swiveling movement for the bodies, and a pin connecting the bolsters for relative pivotal movement about a horizontal axis and for securing the foot plate supporting means against displacement.

6. In an articulated car comprising a pair of car bodies, a truck beneath the adjacent end portions of said bodies, said truck having a pair of bolsters for respectively supporting the said end portions, a foot plate supporting element arranged between the adjacent end portions and the bolsters and defining the axis of swiveling movement for the bodies, and a pin connecting the bolsters for relative pivotal movement about a horizontal axis and for securing the foot plate supporting means against displacement, said supporting means having a part thereof lapping the adjacent end portions of the bodies to prevent excessive relative vertical shifting thereof.

7. In an articulated car comprising a pair of car bodies, a truck arranged beneath the adjacent end portions of the bodies, a pair of truck bolsters, means for supporting the foot plate comprising a buffer element arranged between the end portions and the bolsters and connected to the latter, said buffer element having a supporting flange adapted to receive a foot plate.

8. In an articulated car, a body connection casting comprising a body portion having a horizontally arranged flat shoulder at its forward end and a longitudinally recessed front end wall, and an arcuate bearing member depending from the body portion adjacent the front end wall.

9. In an articulated car comprising a pair of car bodies, a truck beneath the adjacent end portions of the bodies, a pair of truck bolsters having abutting longitudinally recessed projections on their contiguous walls, bearing surfaces on the bolsters for respectively supporting the adjacent end portions for horizontal swiveling movement, a buffing element arranged between the adjacent end portions of the bodies and in the bolster recesses for restraining the bodies and the bolsters against excessive relative sidewise shifting, a part of the buffing element lapping the adjacent end portions for restraining the latter against excessive relative vertical shifting, a foot plate secured to the buffing means and bridging the space between the bodies, and means pivotally connecting the bolsters and securing the buffing element against displacement.

10. In an articulated car, a body connection casting comprising a body portion, the forward end of which is partially vertically recessed to define a horizontally arranged supporting shoulder, and an arcuate bearing member depending from the body portion at its forward end.

In witness whereof I have hereunto set my hand.

JOHN B. D. THOMPSON.